US012663259B2

(12) United States Patent　　　(10) Patent No.:　US 12,663,259 B2

Orschel　　　　　　　　　　　　(45) Date of Patent:　Jun. 23, 2026

(54) FULL WAFER THICKNESS MAP REFLECTOMETRY

(71) Applicant: GlobalWafers Co., Ltd, Hsinchu (TW)

(72) Inventor: Benno Orschel, Frontenac, MO (US)

(73) Assignee: GlobalWafers Co., Ltd., Hsinchu (TW)

( * ) Notice: Subject to any disclaimer, the term of this patent is extended or adjusted under 35 U.S.C. 154(b) by 97 days.

(21) Appl. No.: 18/679,821

(22) Filed: May 31, 2024

(65) Prior Publication Data

US 2024/0401930 A1　　Dec. 5, 2024

Related U.S. Application Data

(60) Provisional application No. 63/505,750, filed on Jun. 2, 2023.

(51) Int. Cl.
　　G01B 11/06　　　(2006.01)

(52) U.S. Cl.
　　CPC .......... G01B 11/06 (2013.01); *G01B 2210/50* (2013.01); *G01B 2210/56* (2013.01)

(58) Field of Classification Search
　　CPC　G01B 11/06; G01B 2210/50; G01B 2210/56; G01B 11/0625; H01L 21/67253; H01L 22/20; H01L 22/12
　　See application file for complete search history.

(56) References Cited

U.S. PATENT DOCUMENTS 8,537,369 B1　　9/2013　Tang
8,949,057 B1　　2/2015　Seong et al.

9,121,684 B2　　9/2015　Tang et al.
2004/0246493 A1 *　12/2004　Kim ................... G01B 11/0625
　　　　　　　　　　　　　　　　　　　356/504
2014/0293295 A1　　10/2014　Kuwabara
(Continued)

FOREIGN PATENT DOCUMENTS

JP　　H11160028 A　　6/1999
JP　　2020085769 A　　6/2020

OTHER PUBLICATIONS

Kitagawa, K. "Transparent film thickness measurement by three-wavelength interference method: An extended application of global model fitting algorithm," In 2012 9th France-Japan & 7th Europe-Asia Congress on Mechatronics (MECATRONICS)/13th Int'l Workshop on Research and Education in Mechatronics (REM), pp. 94-100. IEEE, 2012.

(Continued)

*Primary Examiner* — Tarifur R Chowdhury
*Assistant Examiner* — Akbar H. Rizvi
(74) *Attorney, Agent, or Firm* — Armstrong Teasdale LLP

(57)　　　　ABSTRACT

A method of measuring a thickness of a semiconductor structure includes illuminating the semiconductor structure with the incoherent, uncollimated light from at least one light source, and capturing, using a camera, at least one image of the semiconductor structure illuminated by the light from the light source. The at least one image includes separate first color, second color, and third color images, the first, second, and third colors being different from each other. Thickness maps are produced for at least two layers of the semiconductor structure based on the first color, second color, and third color images and reference first color, second color, and third color images of a reference silicon wafer.

16 Claims, 13 Drawing Sheets

700

706

704

704

702

25
15
10
31

(56) References Cited

U.S. PATENT DOCUMENTS

| 2017/0115112 | A1* | 4/2017 | Srocka | ............... | G01B 11/0625 |
| 2021/0358113 | A1* | 11/2021 | Motamedi | ................. | G06T 5/73 |
| 2022/0371152 | A1* | 11/2022 | Cherian | ............... | B24B 37/013 |
| 2023/0228558 | A1* | 7/2023 | Nomaru | ................. | G01B 11/06 |
| | | | | | 356/503 |
| 2023/0238266 | A1* | 7/2023 | Schulze | ............. | H10P 72/0606 |
| | | | | | 356/601 |

OTHER PUBLICATIONS

International Search Report and Written Opinion for Application No. PCT/US2024/031841, issued Sep. 26, 2024 (15 pages).

* cited by examiner

FULL WAFER THICKNESS MAP REFLECTOMETRY

CROSS-REFERENCE TO RELATED APPLICATIONS

This application claims priority to U.S. Provisional Patent Application No. 63/505,750 filed Jun. 2, 2023, the entire disclosure of which is hereby incorporated by reference in its entirety.

FIELD

The field relates to thickness mapping of semiconductor wafers, and more specifically to methods, systems, and devices for full wafer thickness map reflectometry for silicon on insulator ("SOI") and thick oxide wafers.

BACKGROUND

Silicon on insulator structures ("SOI structures") generally include a handle wafer, a silicon layer (also characterized as a "device layer"), and a dielectric layer (such as an oxide layer) between the handle wafer and the silicon layer. Many silicon semiconductor device designs benefit from using an SOI substrate rather than a bulk silicon polished wafer or epitaxial layer coated substrate. Applications in high volume manufacturing typically benefit from the improved isolation of the device layer, enabling high bandwidth transistors with reduced electro-magnetic cross-talk between adjacent cells within a device.

SOI structures may be prepared from silicon wafers sliced from single crystal silicon ingots grown in accordance with the Czochralski (Cz) method. In one method for preparing an SOI substrate, a dielectric layer is deposited on a polished front surface of a donor wafer. Ions are implanted at a specified depth beneath the front surface of the donor wafer to form a damage layer in the donor wafer at the specified implant depth. The front surface of the donor wafer is then bonded to a handle wafer and the two wafers are pressed to form a bonded wafer pair. The bonded wafer pair is then cleaved along a cleave plane within the damage layer to remove the portion of the donor wafer below the damage layer, leaving behind a thin silicon layer (i.e., the device layer) atop the handle wafer to form the SOI layered substrate.

The mechanical cleave of the bonded wafer pair may result in non-uniform device layer thickness as the cleave progresses from the leading edge at which the cleave commences toward the trailing edge at which the bonded wafers fully separate. Further, in some instances, the cleave may fail and the bonded wafer structure is not cleaved along the desired cleave plane or the bonded wafer structure does not cleave at all. Variations in the cleave are conventionally monitored by operator observation at a downstream process, which may not provide timely feedback to monitor or adjust the appropriate process upstream or at cleaving.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF SUMMARY

One aspect is a thickness measuring system including a camera positioned above a center of a semiconductor structure to capture light reflected by the semiconductor structure, at least one light source providing incoherent, uncollimated light, and a controller including a processor and a memory. The controller is operatively coupled to the RGB camera and the at least one light source. The memory includes instructions that when executed by the processor cause the controller to illuminate the semiconductor structure with the incoherent, uncollimated light from the at least one light source and cause the camera to capture at least one image of the semiconductor structure illuminated by the light from the light source. The at least one image includes separate first color, second color, and third color images, the first, second, and third colors being different from each other. The instructions further cause the processor to produce thickness maps for at least two layers of the semiconductor structure based on the first color, second color, and third color images and reference first color, second color, and third color images of a reference silicon wafer.

Another aspect is a method of measuring a thickness of a semiconductor structure. The method includes illuminating the semiconductor structure with the incoherent, uncollimated light from at least one light source, and capturing, using a camera, at least one image of the semiconductor structure illuminated by the light from the light source. The at least one image includes separate first color, second color, and third color images, the first, second, and third colors being different from each other. Thickness maps are produced for at least two layers of the semiconductor structure based on the first color, second color, and third color images and reference first color, second color, and third color images of a reference silicon wafer.

Various refinements exist of the features noted in relation to the above-mentioned aspect. Further features may also be incorporated in the above-mentioned aspect as well. These refinements and additional features may exist individually or in any combination. For instance, various features discussed below in relation to any of the illustrated embodiments may be incorporated into the above-described aspect, alone or in any combination.

BRIEF DESCRIPTION OF THE DRAWINGS

Corresponding reference characters indicate corresponding parts throughout the drawings.

DETAILED DESCRIPTION

Figure 1:
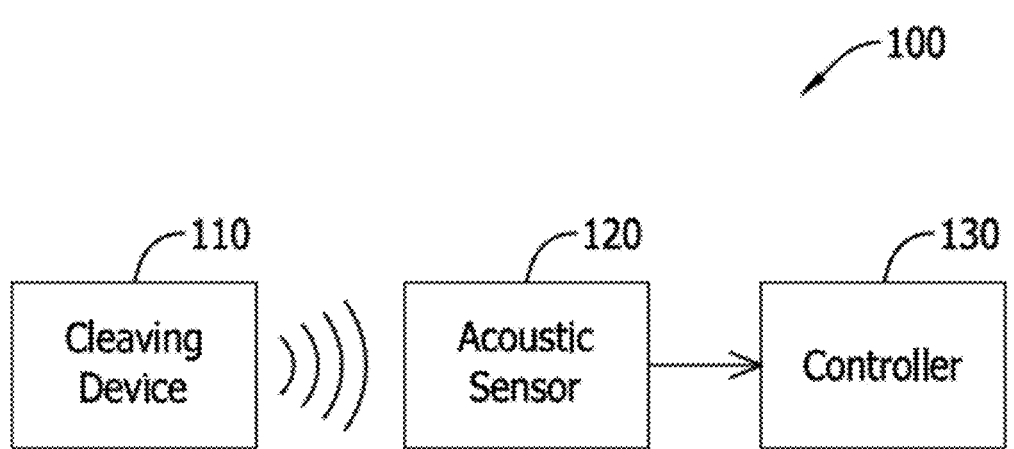
FIG. 1 is a schematic of a cleave system for separating a bonded wafer structure along a cleave plane.

With reference to FIG. 1, a cleave system 100 for separating a bonded wafer structure is shown schematically. The cleave system 100 includes a cleaving device 110 for cleaving the bonded wafer structure and an acoustic sensor 120 for sensing sound emitted from the bonded wafer structure during cleaving.

Bonded wafer structures that may be processed by the cleaving device 110 include any semiconductor structures in which it is desirable to separate the structure into two distinct structures. In some embodiments, the structure that is processed may be a bonded wafer structure that is used to prepare a silicon on insulated structure. Such bonded structures may include a handle wafer, donor wafer, and a dielectric layer disposed between the handle wafer and donor wafer. The following is merely one example of methods and systems for processing bonded wafer structures.

Figure 2:
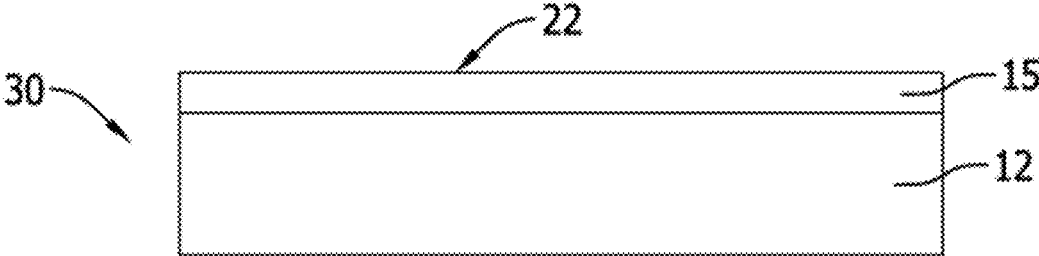
FIG. 2 is a cross-section view of a donor structure having a donor wafer with a dielectric layer thereon.

An example of a donor structure 30 that may be bonded to a handle structure to form a bonded wafer structure is shown in FIG. 2. The donor structure 30 may be formed with a dielectric layer 15 deposited on the front surface of a donor wafer 12. It should be understood that, alternatively, the dielectric layer may be grown or deposited on the handle wafer or a dielectric layer may be grown on both the donor wafer and handle wafer and that these structures may be bonded in any of the various arrangements without limitation. Suitable donor wafers 12 may be composed of silicon, germanium, silicon germanium, gallium nitride, aluminum nitride, gallium arsenide, indium gallium arsenide and any combination thereof. In some embodiments, the donor wafer is composed of single crystal silicon.

The dielectric layer 15 may be any electrically insulating material suitable for use in a SOI structure, such as a material comprising $SiO_2$, $Si_3N_4$, aluminum oxide, or magnesium oxide. In some embodiments, the dielectric layer 15 is $SiO_2$ (i.e., the dielectric layer consists essentially of $SiO_2$). In various embodiments, the dielectric layer forms a buried oxide (BOX) layer of the final SOI structure. The dielectric layer 15 may be applied according to any known technique in the art, such as thermal oxidation, wet oxidation, thermal nitridation or a combination of these techniques. In this regard it should be understood that, while the layered semiconductor structures may be described herein as having a dielectric layer, in some embodiments the dielectric layer is eliminated (i.e., a dielectric layer is not deposited on the donor wafer or handle wafer prior to bonding) and the handle wafer and donor wafer are "direct bonded." Reference herein to such dielectric layers should not be considered in a limiting sense. Any one of a number of techniques known to those of skill in the art may be used to produce such direct bonded structures. In such embodiments, the bonding surface of the donor structure is the surface of the donor wafer itself.

Figure 3:
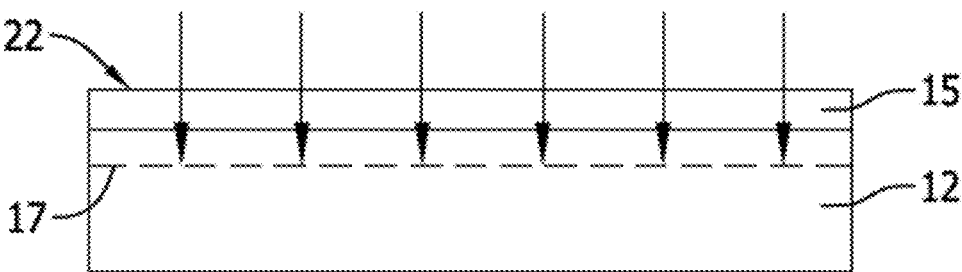
FIG. 3 is cross-section view of the donor structure during ion implantation thereon.

As shown for example in FIG. 3, ions (e.g., hydrogen atoms, helium atoms or a combination of hydrogen and helium atoms) may be implanted at a substantially uniform specified depth beneath the front surface 22 of the donor structure to define a cleave plane 17. It should be noted, that when helium and hydrogen ions are co-implanted into the structure to form the cleave plane, they may be implanted concurrently or sequentially. In some embodiments, ions are implanted prior to deposition of the dielectric layer 15. When implantation is performed prior to deposition of the dielectric layer 15, the subsequent growth or deposition of the dielectric layer on the donor wafer is suitably performed at a temperature low enough to prevent premature separation or cleaving along plane 17 in the donor layer (i.e., prior to the wafer bonding process step). The handle structure may include a handle wafer obtained from any suitable material for preparing multi-layered structures, such as silicon, silicon carbide, sapphire, germanium, silicon germanium, gallium nitride, aluminum nitride, gallium arsenide, indium gallium arsenide, quartz and combinations thereof. The handle structure 10 (FIG. 4) may include a dielectric layer deposited on a handle wafer or, as in other embodiments, consists only of a handle wafer (i.e., does not include a dielectric layer). The handle wafer and donor wafer may be single crystal silicon wafers and may be single crystal silicon wafers which have been sliced from a single crystal ingot grown in accordance with conventional Czochralski crystal growing methods.

Figure 4:
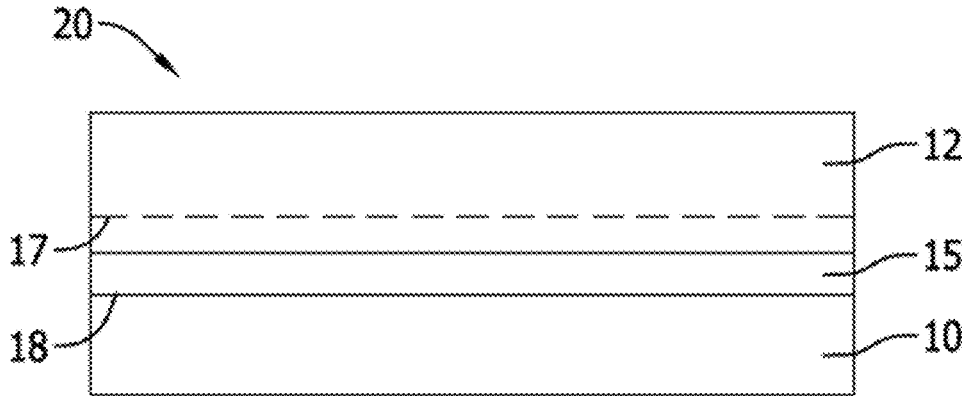
FIG. 4 is a cross-section view of the donor structure bonded to a handle structure.

As shown in FIG. 4, the front surface of the dielectric layer 15 of the donor structure is suitably bonded to the front surface of a handle structure 10 to form a bonded wafer structure 20 through a bonding process. The dielectric layer 15 and handle structure 10 may be bonded together while performing a surface activation by exposing the surfaces of the structures to a plasma containing, for example, oxygen or nitrogen. The wafers are then pressed together and a bond at the bond interface 18 is formed there between. Generally speaking, wafer bonding may be achieved using essentially any technique known in the art, provided the energy employed to achieve formation of the bond interface is sufficient to ensure that the integrity of the bond interface is sustained during subsequent processing (i.e., layer transfer by separation along the cleave or separation plane 17 in the donor wafer). Once prepared, the bonded wafer structure 20 is placed in the cleaving device 110 (FIG. 1) to separate (i.e., cleave) a portion of the donor wafer along the cleave plane from the bonded structure to form the layered semiconductor structure. Generally speaking, the cleaving device 110 may induce this fracture using techniques known in the art, such as thermally and/or mechanically induced cleaving techniques.

Figure 5:
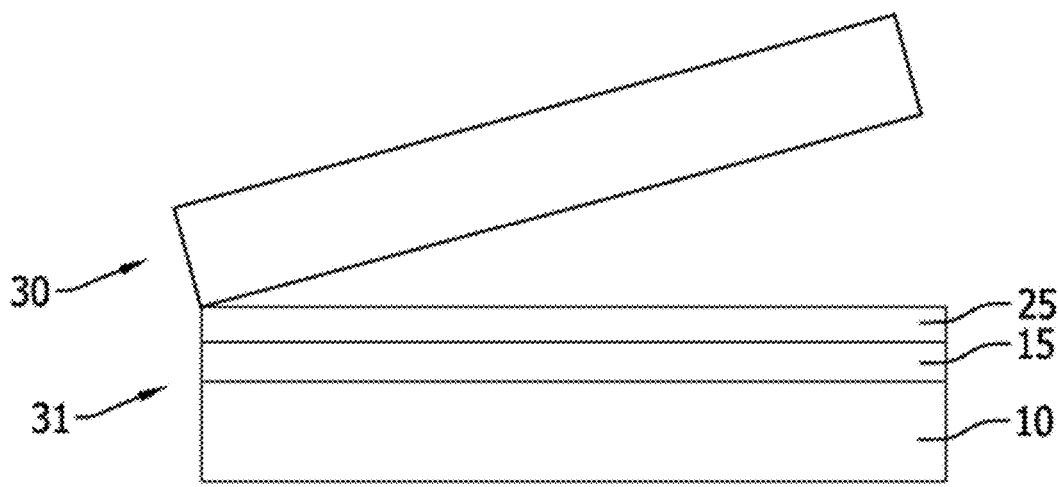
FIG. 5 is a cross-section view of a bonded wafer structure upon cleaving the donor structure at the cleave plane.

Referring to FIG. 5, upon separation, two structures 30, 31 are formed. Because the separation of the bonded wafer structure 20 occurs along the cleave plane 17 in the donor structure 12 (FIG. 4), a portion of the donor structure remains part of both structures (i.e., a portion of the donor wafer is transferred along with the dielectric layer). Structure 30 comprises a portion of the donor wafer. Structure 31 is the SOI structure and includes a handle layer 10, dielectric layer 15 (also referred to sometimes as BOX layer), and device layer 25 (the portion of the donor wafer remaining after cleaving) disposed atop the dielectric layer 15. The device layer may also be referred to sometimes herein as the SOI layer. In embodiments in which the donor structure and handle structure both include a dielectric layer, the dielectric layers combine to form the dielectric layer 15 of the SOI structure. The cleave surface of the layered semiconductor structure (i.e., the thin device layer of the donor wafer) has a rough surface that may be smoothed by additional processing. The structure 31 may be subjected to additional processing to produce a device layer surface having desirable features for device fabrication thereon. The cleaving device 110 used to separate the bonded wafer structure along the cleave plane may be a mechanical cleaving device in which separation is induced or achieved by means of mechanical force, either alone or in addition to annealing. For instance, the bonded structure may be placed in a fixture in which mechanical force is applied perpendicular to the opposing sides of the bonded structure in order to pull a portion of the donor structure apart from the bonded structure.

Figure 6:
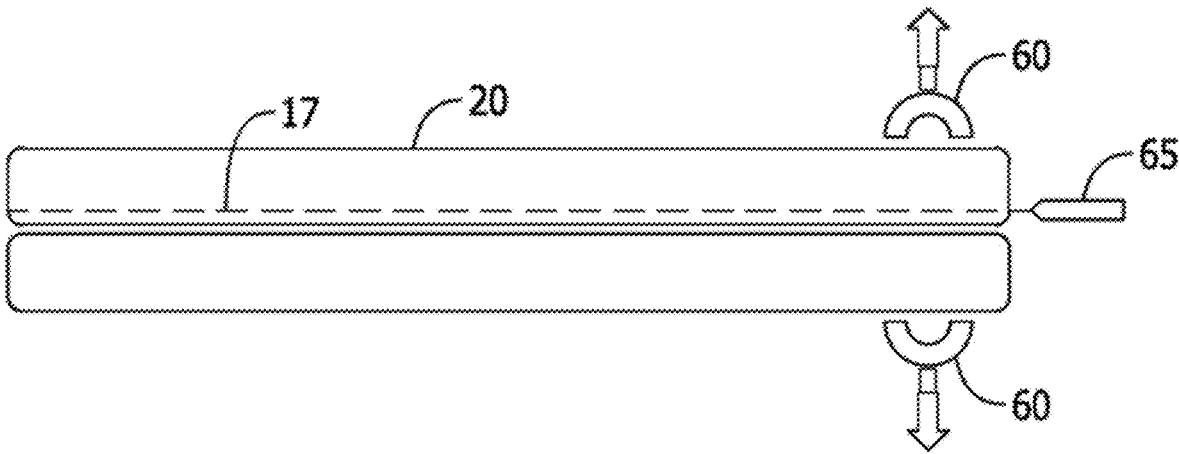
FIG. 6 is a cross-section view of a bonded wafer structure having suction cups and a blade to propagate the cleave.

As shown in FIG. 6, an example cleaving device includes suction cups 60 that apply mechanical force near a leading cleave edge of the bonded wafer structure 20. The separation of the portion of the donor wafer may be initiated by applying a mechanical wedge or blade 65 at the edge of the bonded wafer at the cleave plane 17 in order to initiate propagation of a crack along the cleave plane 17. The mechanical force applied by the suction cups 60 then pulls the portion of the donor structure from the bonded structure, thus forming the SOI structure. Mechanical cleaving devices are commercially available such as the Debond & Cleave Tools from Silicon Genesis Corporation (San Jose, California).

In alternative embodiments, the cleaving device 110 is a thermal cleaving device in which fracturing is achieved by annealing the bonded structure. For example, a thermal cleave may performed at a temperature about 200° C. to about 800° C., or from about 250° C. to about 650° C. for a period of at least about 10 seconds, at least about 1 minute, at least about 15 minutes, at least about 1 hour or even at least about 3 hours (with higher temperatures requiring shorter anneal times, and vice versa), under an inert (e.g., argon or nitrogen) atmosphere or ambient conditions. The thermal cleaving device 110 may be a belt furnace in which propagation of the cleave is achieved at the leading edge of the bonded structure (i.e., the leading edge in the direction of travel of the structure through the furnace) and proceeds toward the trailing edge of the bonded wafer structure. Other types of cleaving devices may also be used.

The cleaving device 110 may generally be configured to process any size of bonded wafer structures including, for example, 200 mm, 300 mm, greater than 300 mm or even 450 mm diameter bonded wafer structures. In some embodiments, the cleaving device is configured to process bonded wafer structures that are 200 mm or 300 mm in diameter.

With reference again to FIG. 1, the cleaving system 100 includes an acoustic sensor 120 for sensing sound emitting from the bonded wafer structure during cleaving and for generating an output in response to the sensed sound. The acoustic sensor 120 may be a microphone, piezo sensor, MEMS device or a sound pressure or field transducer.

A controller 130 is configured to control the cleaving device and generate one or more metrics related to an attribute(s) of the cleave (e.g., duration of cleave, quality of cleave, whether a no-layer-transfer condition occurred or a pause in the cleave as it progresses across the wafer) based on the recorded output from the acoustic sensor 120. In some embodiments, the metric generated by the controller 130 is derived from an audio power profile generated during the cleave. The audio power profile may be derived from the audio amplitude. Examples of metrics that may be calculated include the delay between when the cleave is triggered and the sensed start of the cleave, the duration of the cleave, the mean power during the cleave, the maximum power, the frequency at which maximum power occurs, standard deviation of power, magnitude of power oscillations, amount of cleave time below a threshold power, maximum single dip time below a threshold power and the number of power dips below a threshold power. In some embodiments, 2 or more metrics are generated or even 3 or more, 5 or more, 7 or more or 10 or more metrics are generated by the controller 130.

The controller 130 may be a computer system. Computer systems, as described herein, refer to any known computing device and computer system. As described herein, all such computer systems include a processor and a memory. However, any processor in a computer system referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

The term processor, as used herein, refers to central processing units, microprocessors, microcontrollers, reduced instruction set circuits (RISC), application specific integrated circuits (ASIC), logic circuits, and any other circuit or processor capable of executing the functions described herein. The above are examples only and are thus not intended to limit in any way the definition and/or meaning of the term "processor."

The term "database" may refer to either a body of data, a relational database management system (RDBMS), or to both and a database may include any collection of data including hierarchical databases, relational databases, flat file databases, object-relational databases, object oriented databases, and any other structured collection of records or data that is stored in a computer system. The above are examples only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

In one embodiment, a computer program is provided to enable the controller 130, and this program is embodied on a computer readable medium. In an example embodiment, the computer system is executed on a single computer system, without requiring a connection to a server computer. In a further embodiment, the computer system is run in a Windows® environment (Windows is a registered trademark of Microsoft Corporation, Redmond, Washington). In yet another embodiment, the computer system is run on a mainframe environment and a UNIX® server environment (UNIX is a registered trademark of X/Open Company Limited located in Reading, Berkshire, United Kingdom). Alternatively, the computer system is run in any suitable operating system environment. The computer program is flexible and designed to run in various different environments without compromising any major functionality. In some embodiments, the computer system includes multiple components distributed among a plurality of computing devices. One or more components may be in the form of computer-executable instructions embodied in a computer-readable medium.

The computer systems and processes are not limited to the specific embodiments described herein. In addition, components of each computer system and each process can be practiced independent and separate from other components and processes described herein. Each component and process also can be used in combination with other assembly packages and processes.

In another embodiment, the memory included in the computer system of the controller 130 may include a plurality of modules. Each module may include instructions configured to execute using at least one processor. The instructions contained in the plurality of modules may implement at least part of the methods described herein when executed by the one or more processors of the computing device.

The computer system of one embodiment includes one media output component for presenting information to a user. Media output component is any component capable of conveying information (e.g., such as metrics associated with the cleave) to a user. In some embodiments, media output component includes an output adapter such as a video adapter and/or an audio adapter. An output adapter is operatively coupled to a processor and is further configured to be operatively coupled to an output device such as a display device (e.g., a liquid crystal display (LCD), organic light emitting diode (OLED) display, cathode ray tube (CRT), or "electronic ink" display) or an audio output device (e.g., a speaker or headphones).

Figure 7:
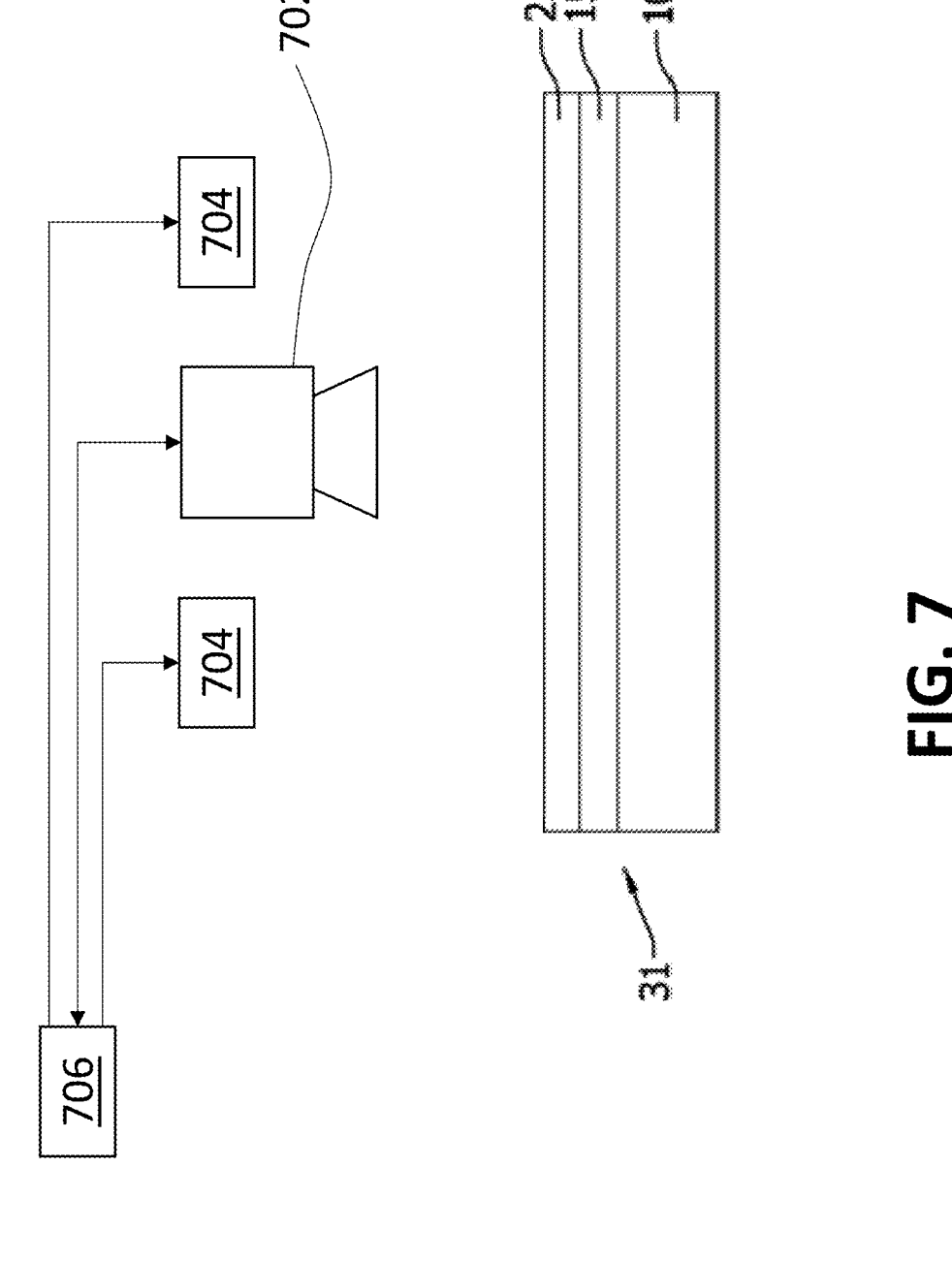
FIG. 7 is an example imaging station for performing reflectometry.

FIG. 7 is an example imaging station 700 for performing reflectometry (also referred to sometimes herein as a thickness measuring station or system). The imaging station 700 may be part of the cleave system 100 or may be separate from the cleave system 100. Further, the imaging station 700 may be additionally used for imaging other than for reflectometry imaging. IN the example embodiment, the imaging station 700 is used to image SOI structure 31 after the cleaving is performed. In some embodiments, the imaging station 700 may be used on the bonded wafer 20 before cleaving. Additionally or alternatively, the imaging station 700 may be used for imaging and/or reflectometry of a wafer or structure at any point in the production process.

The imaging station 700 includes a camera 702, light sources 704, and a controller 706 to control the camera 702 and the light sources 704 to image the SOI structure 31 and to produce one or more thickness map of the SOI structure 31.

In the example embodiment, the imaging station 700 is used for RGB reflectometry, and the camera 702 is an RGB camera operable to separately capture red, green, and blue light, each in a separate channel. In other embodiments, the camera is an n-color camera. For example, a monochrome camera may be used in combination with a set of n filters. Each filter is used with the camera to capture one of n different color images.

The camera 702 is positioned above the center of the structure 31 (or the structure is moved into position with its center directly underneath the camera 702). The camera 702 has a wide enough field of view to capture an image of the entire SOI structure 31 without moving.

Although two lights are shown, any suitable number of lights 704 may be included. In the example embodiment, the light sources 704 include separately controllable red, green, and blue light emitting diodes (LEDs) that each emit light at known wavelengths. In other embodiments, the light sources are full spectrum LEDs, any other color or combination of color LEDs, or any other suitable light source for use in reflectometry. In the example embodiments, the light sources 704 are incoherent light sources. That is, the light sources produce light that is not coherent and contains more than one wavelength, frequency, and/or phase of light.

The controller 706 may be the controller 130, or a separate controller including similar components. The controller 706 controls the light sources 704 to illuminate the SOI structure 31 and controls the camera 702 to capture light reflected from the SOI structure 31. At least some of the light hitting the SOI structure 31 will travel through one or more of the layers of the structure 31 before reflecting back to the camera 702. Based on the wavelengths of the light, how the material of each layer affects the speed, reflection, and absorption of light, and the intensity of the light captured by the camera 702, the thickness of the layers of the SOI structure 31 across the entire structure may be determined by the controller 706.

One or more parameters of the cleave process performed by the cleaving device may then be modified by the controller 706 based on the generated thickness maps to correct for errors or generally improve the cleave process for the next wafer.

In an example embodiment, the controller 706 controls the lights 704 to illuminate the SOI structure 31 and captures an image of the SOI structure with the camera 702. The image includes a red image, a green image, and a blue image, each captured by a different channel of the RGB camera 702.

The accuracy of the method being described may be improved by capturing and stacking a plurality of images, but at the expense of additional time required to capture the multiple images. Further the improvement may depend on the amount of noise in each image. For example, with gain and exposure producing an image with a single digit noise factor, one hundred images would result in accuracy improving by a factor of 10 (or error decreasing by a factor of 10). Additionally, the resolution of the camera 702 is a factor in determining the accuracy of the thickness maps produced by this method. If the camera 702 has an 8-bit resolution, the relative errors for some of the ratios discussed below will be less than 0.02, while the error would be less than 0.005 if the camera 702 has a 10-bit resolution.

Figure 8:
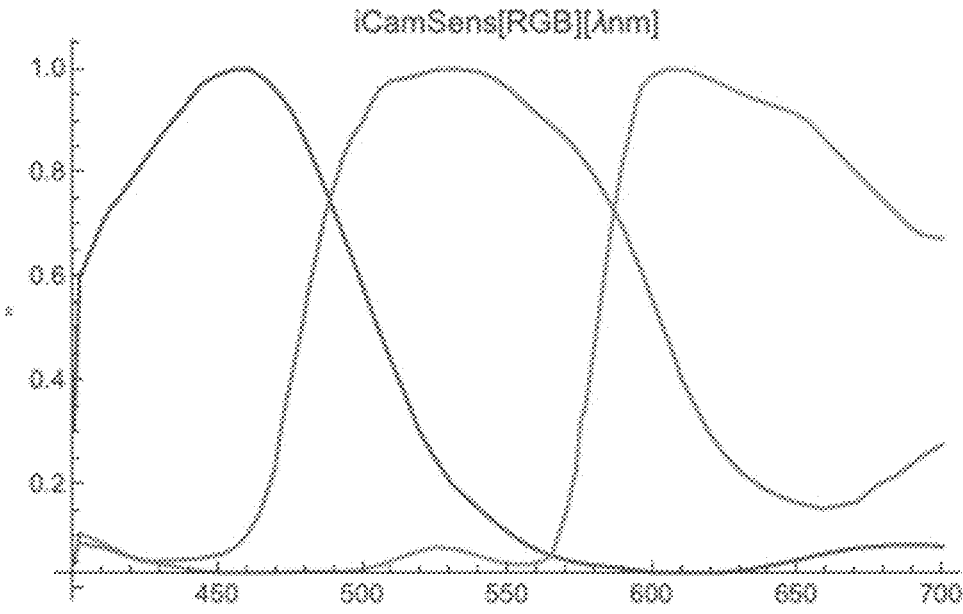
FIG. 8 is a graph of an example RGB camera filter spectra.
Figure 9:
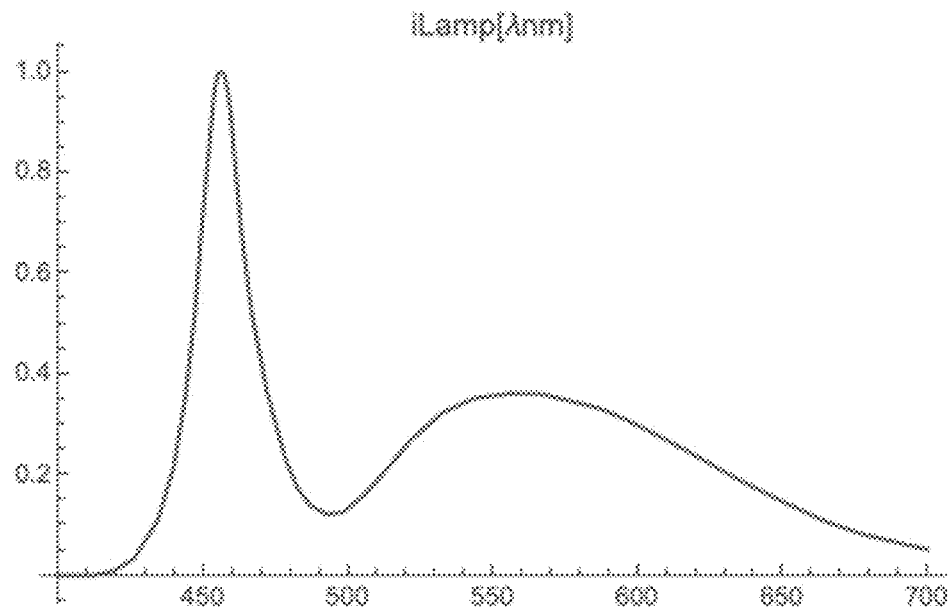
FIG. 9 is a graph of the white spectrum of an example LED.
Figure 10:
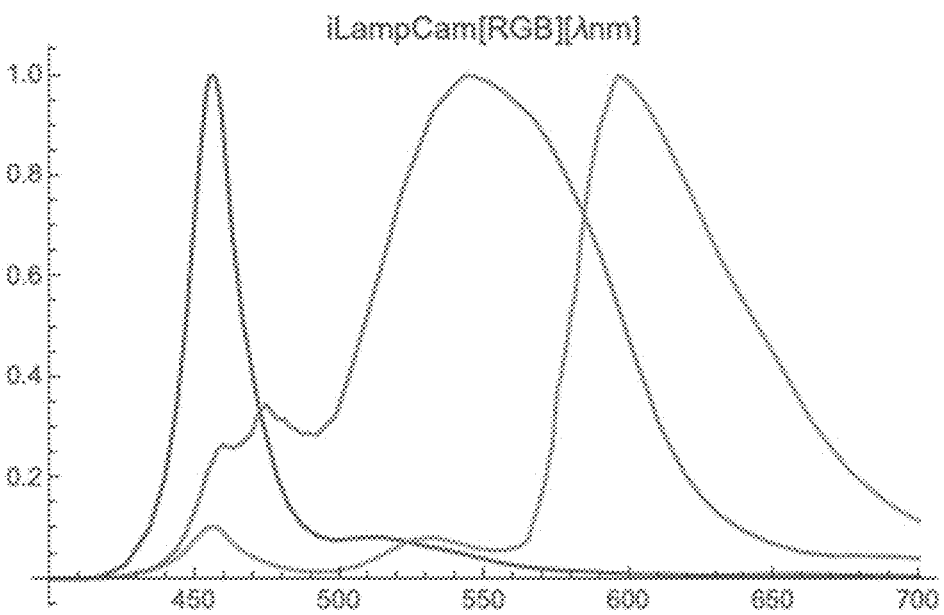
FIG. 10 is a graph of the resulting channel spectra when the example RGB camera from FIG. 8 is used with the example white LED from FIG. 9.
Figure 11:
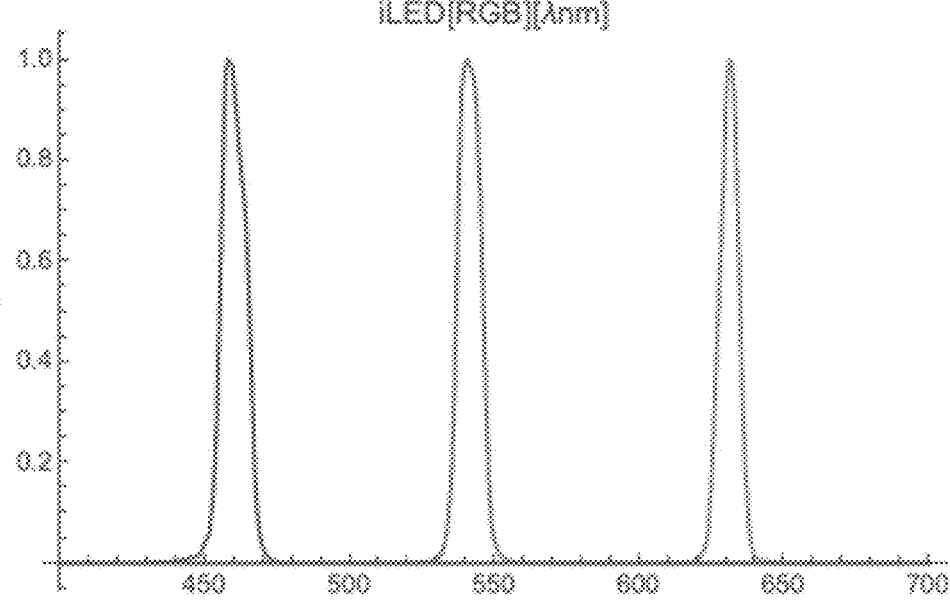
FIG. 11 is a graph of the spectra of an example RGB LED.
Figure 12:
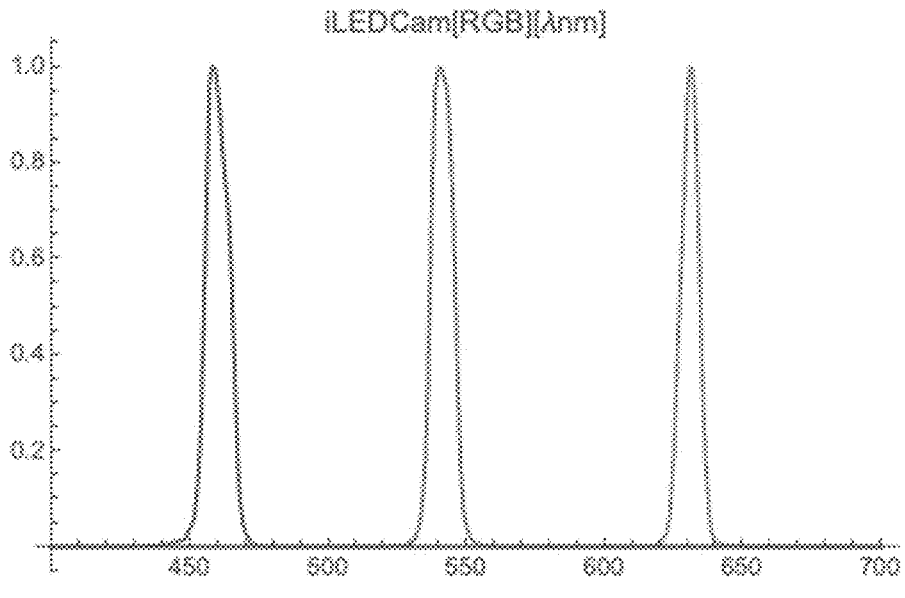
FIG. 12 is a graph of the resulting channel spectra when the example RGB camera from FIG. 8 is used with the example RGB LED from FIG. 11.
Figure 13:
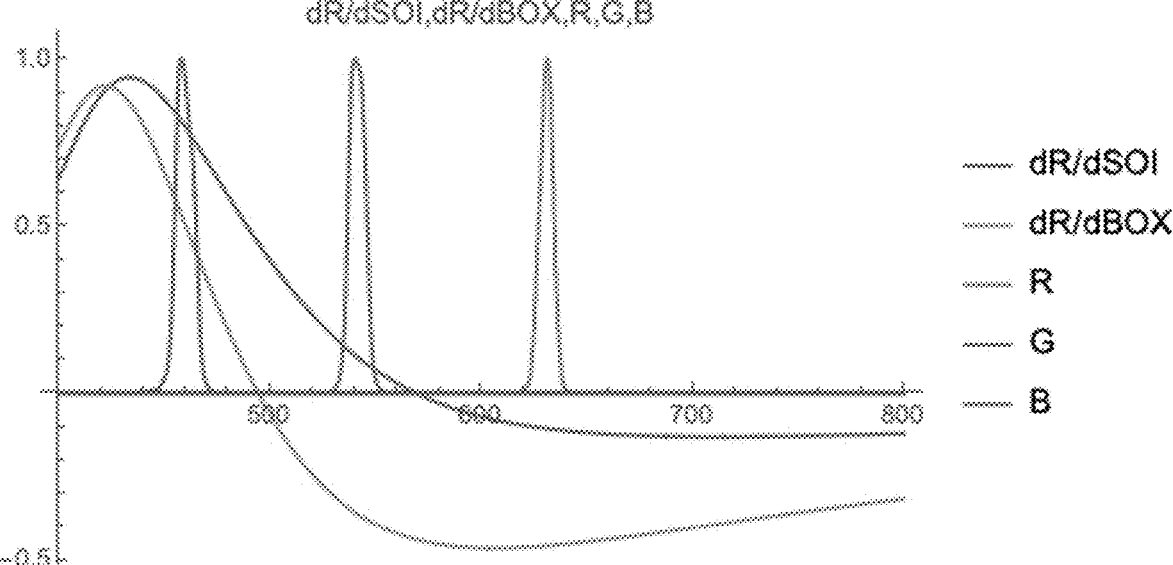
FIG. 13 is a graph of the resulting channel spectra from FIG. 12 and wavelength dependent SOI and BOX deviation sensitivity.
Figure 14:
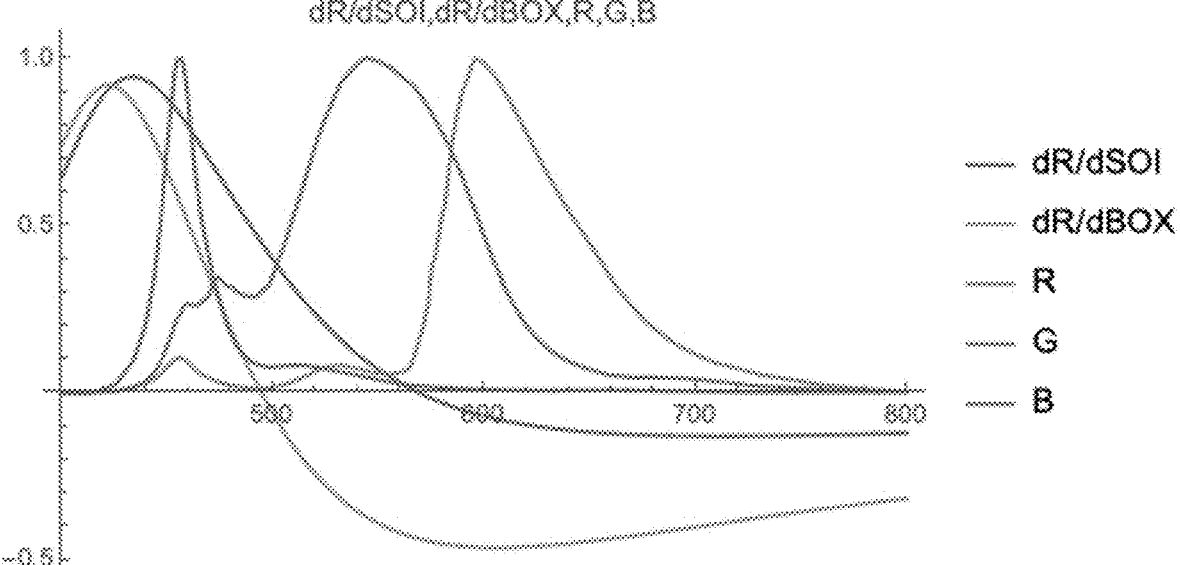
FIG. 14 is a graph of the resulting channel spectra from FIG. 11 and wavelength dependent SOI and BOX deviation sensitivity.

The lighting provided by the light sources 704 may also affect the accuracy of the thickness maps to be produced. Diffuse, broad spectrum, white light will produce less accurate results than separate, narrow band light in the red, green, and blue wavelengths, as is demonstrated by the graphs of FIGS. 8-14. FIG. 8 is a graph of an example RGB camera filter spectra. FIG. 9 is a graph of the white spectrum of an example LED. FIG. 10 is a graph of the resulting channel spectra when the example RGB camera from FIG. 8 is used with the example white LED from FIG. 9. FIG. 11 is a graph of the spectra of an example RGB LED. FIG. 12 is a graph of the resulting channel spectra when the example RGB camera from FIG. 8 is used with the example RGB LED from FIG. 11. FIG. 13 is a graph of the resulting channel spectra from FIG. 12 and wavelength dependent SOI and BOX deviation sensitivity. FIG. 14 is a graph of the resulting channel spectra from FIG. 11 and wavelength dependent SOI and BOX deviation sensitivity.

Figure 15:
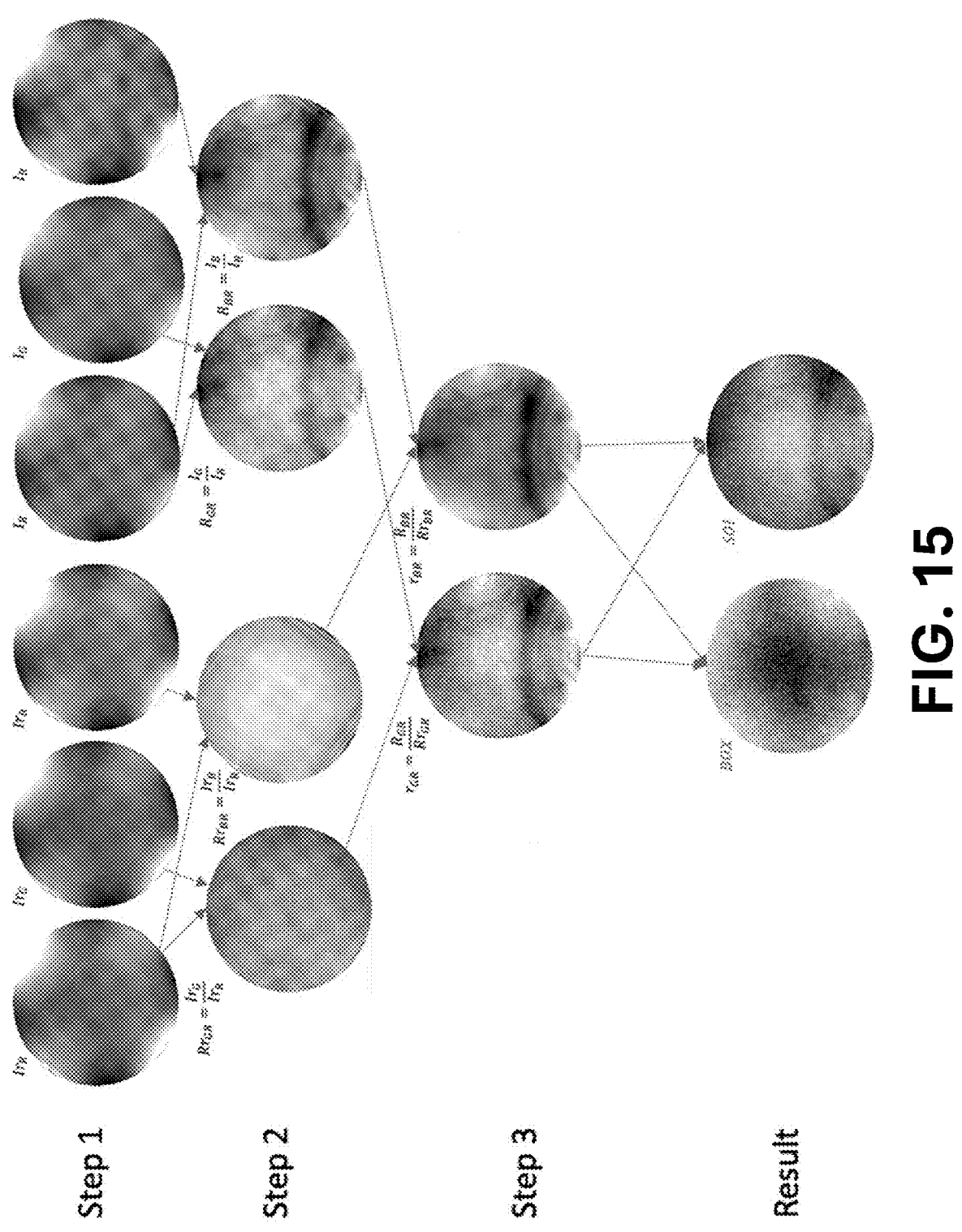
FIG. 15 is an example method of reducing lighting imperfections and creating calibration-free layer thickness maps.

FIG. 15 illustrates part of the example method of reducing lighting imperfections and creating calibration-free layer thickness maps.

As part of the map production, in step 1, the controller 706 captures or retrieves the red, green, and blue intensity images ($I_R$, $I_G$, and $I_B$) of the SOI structure 31 (sometimes referred to as the sample) and also retrieves red, green, and blue intensity images ($Ir_R$, $Ir_G$, and $Ir_B$) for a reference, bare silicon wafer that were taken with the same, or a similar, camera 702 under the same or similar conditions (e.g., lighting, temperature, etc.). The images of the sample SOI structure and the bare silicon reference wafer show two types of lighting imperfections. The first type of imperfections are imperfections caused by uncalibrated illumination of the structures (both the bare silicon and the SOI structure) when imaging the structures. These imperfections are visible as intensity hot spots located on the north-east and south-west on the wafers. The second type of imperfections are wavelength dependent illumination imperfections. These imperfections appear as a checker-board intensity pattern in the images.

In step 2, the controller 706 corrects for the uncalibrated illumination of the structures by using ratios of the image intensities of two of the different color images to the third color image. For example, the controller 706 calculates the ratio of intensity of the green image to the intensity of the red image for the SOI structure and for the reference bare silicon wafer. Thus, the ratio for the SOI structure is $$R_{GR} = \frac{I_G}{I_R}$$

and the ratio for the reference wafer is $$Rr_{GR} = \frac{Ir_G}{Ir_R}.$$

The controller 706 also calculates the ratio of the intensity of the blue image to the intensity of the red image as $$R_{BR} = \frac{I_B}{I_R}$$

for the SOI structure and $$Rr_{BR} = \frac{I_B}{I_R}$$

for the reference wafer. Any of the three colors may be the denominator in the ratio, but the same color must be used for all ratios in any particular map calculation. As can be seen in the images of step 2, taking these ratios reduces or eliminates the intensity hotspots that are visible at step 1. Additionally, in other embodiments, more than three colors may be used and the techniques described herein may be expanded to include additional ratios using the additional color(s). Further, it should be understood that when the ratio of, for example, the green image to the red image is taken, the intensity value of each pixel in green image is divided by the intensity value of the corresponding pixel in the red image. Thus, the result is a new image with the intensity value of each pixel in the new image being equal to the ratio of the intensity value of the corresponding pixel from the green image divided by the intensity value of the corresponding pixel from the red image. The result may be referred to herein as an image or as a ratio.

In step 3, to reduce wavelength dependent illumination imperfections, the ratios determined above for the SOI structure are divided by the corresponding intensity ratios for the reference, bare silicon wafer. That is, the controller calculates $$r_{GR} = \frac{R_{RR}}{Rr_{GR}} \text{ and } r_{BR} = \frac{R_{BR}}{Rr_{BR}}.$$

As seen in the step 3 images, this reduces or removes the checkerboard pattern visible in the step 2 images.

After step 3 is completed, the correction of the images to compensate for the uncalibrated illumination is complete and the resulting intensity images (e.g., rGR and rBR) are then further processed to calculate layer thickness maps. The resulting intensity images $r_{GR}$ and $r_{BR}$ may be processed using any known techniques for producing thickness maps from such images. An example process will be described below.

Figure 17:
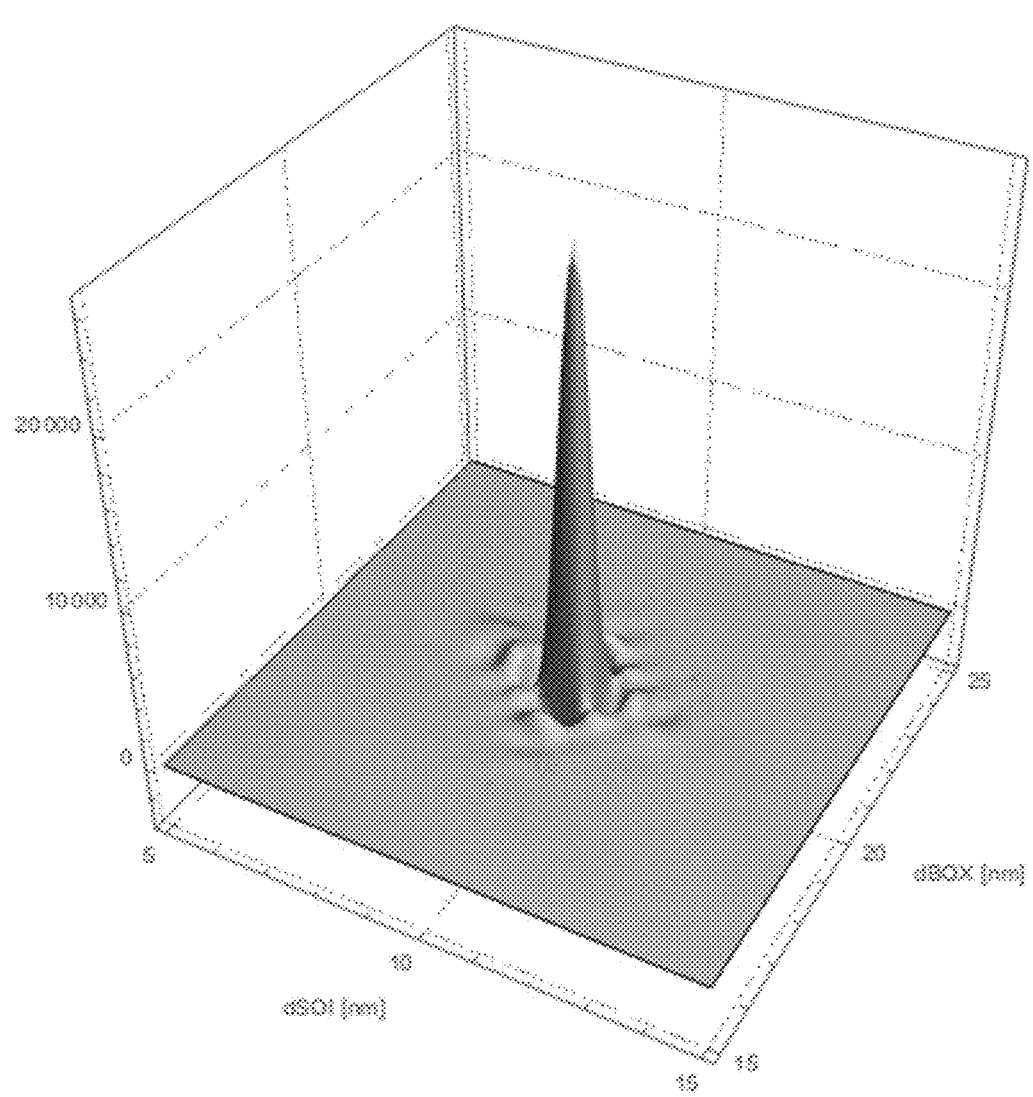
FIG. 17 is a graph of a weight function for a given measured pair of measured ratios rGR and rBR versus modeled ratios rGR and rBR.

First, an average thickness of each layer of the structure across the whole structure is calculated from the resulting images $r_{GR}$ and $r_{BR}$. This may be determined by inputting both $r_{GR}$ and $r_{BR}$ into a model of the layers. For example, FIG. 17 is a graph of a weight function for a given measured pair of measured ratios $r_{GR}$ and $r_{BR}$ versus modeled ratios $r_{GR}$ and $r_{BR}$. The weight at each pixel/location is determined by Equation 1 below.

$$\frac{1}{(og(r_{GR,meas}) - og(r_{GR,model}))^2 + (og(r_{BR,meas}) - og(r_{BR,model}))^2 + 1E - 10} \quad (1)$$

The peak in FIG. 17 is the location at which the measured ratios $r_{GR}$ and $r_{BR}$ are very close to the modeled ratios $r_{GR}$ and rBR. This is used in a non-linear search for the wafer average dSOI/dBOX values using the wafer averages for measured rGR and rBR.

Figure 16:
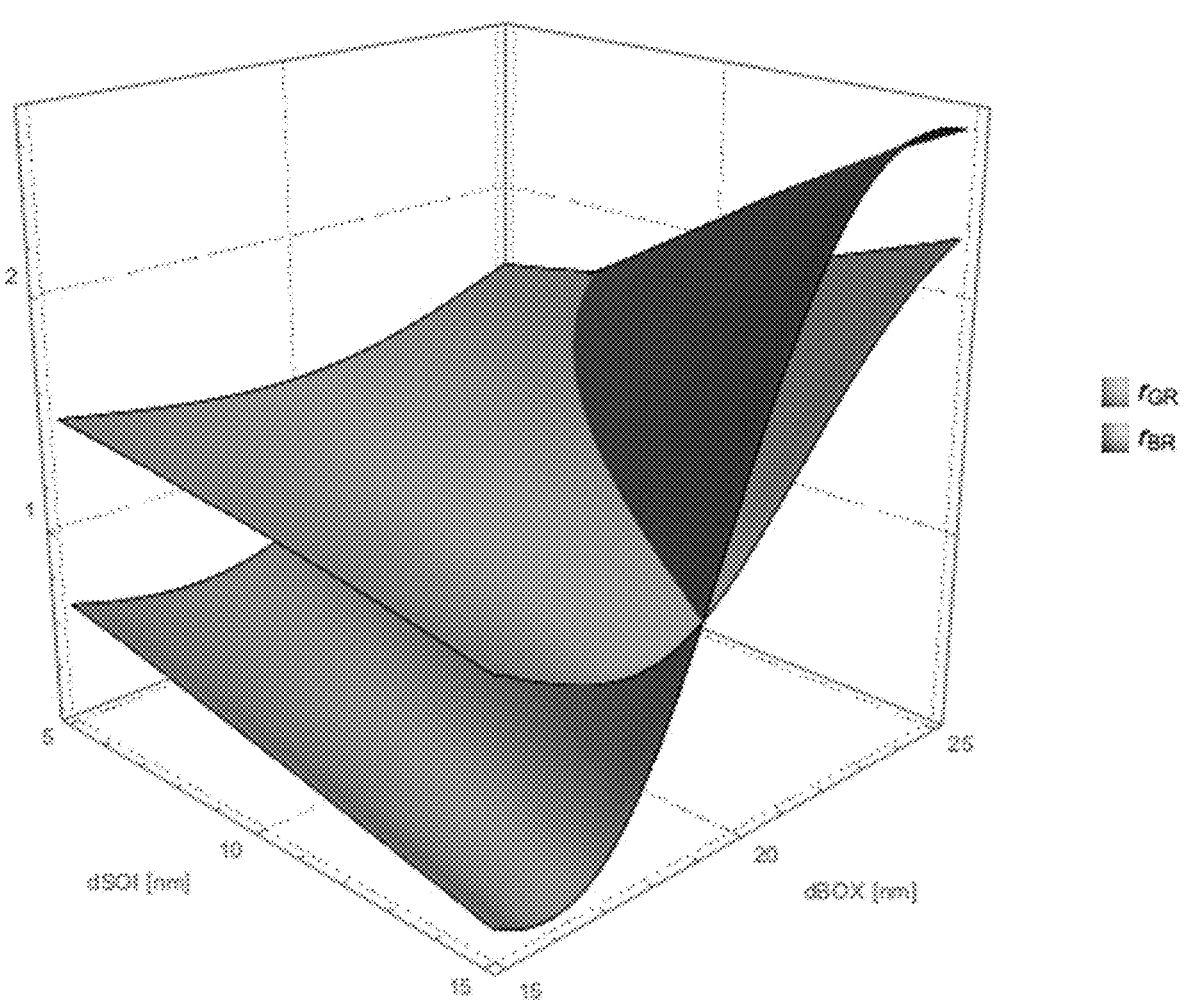
FIG. 16 is a graph of modeled ratios rGR and rBR as a function of dSOI and dBOX.
Figure 18:
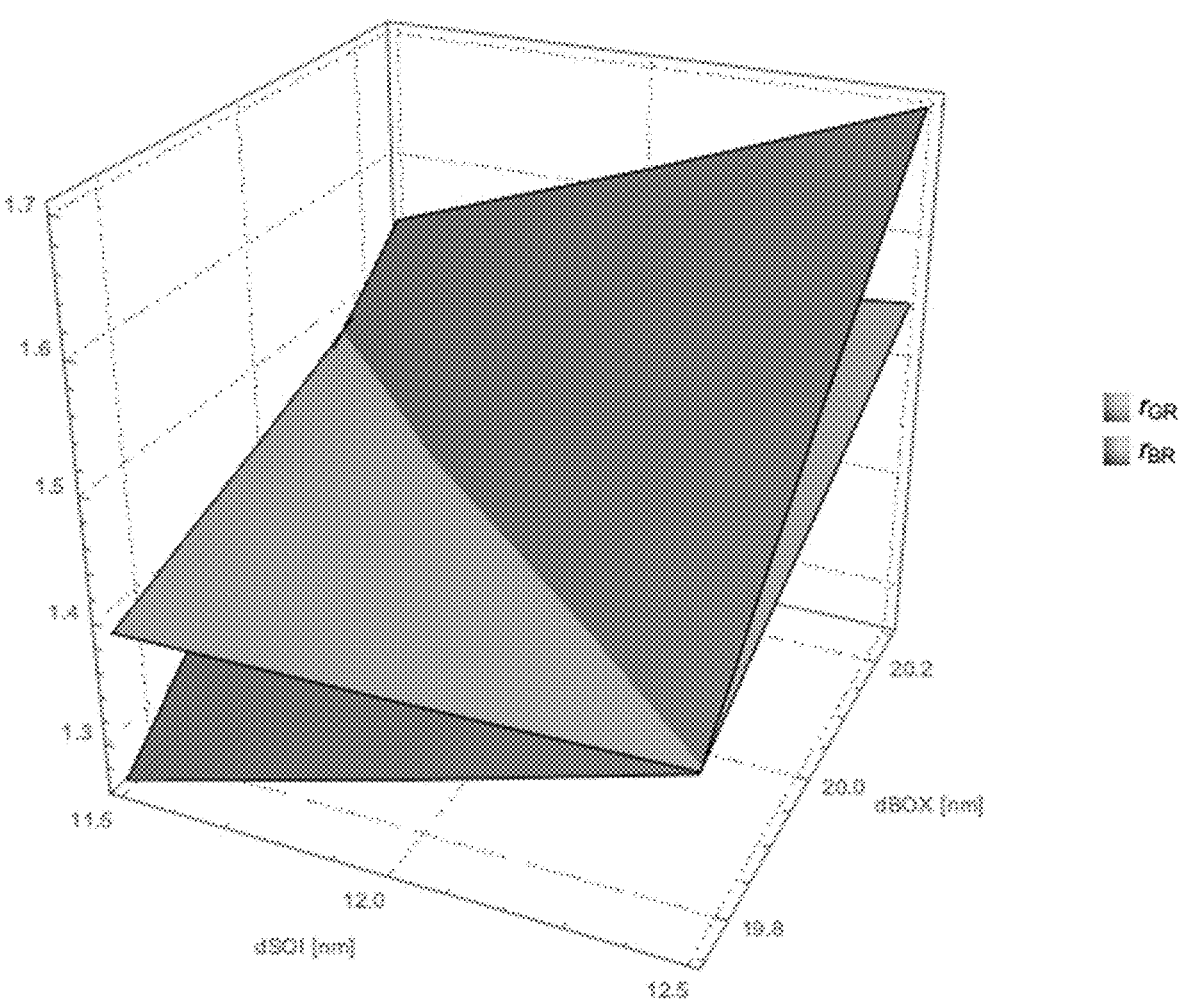
FIG. 18 is a graph of the modeled ratios rGR and rBR as a function of dSOI and dBOX for a narrower range of dSOI and dBOX than in FIG. 16.

Once the overall average thicknesses for the SOI layer ($\overline{SOI}$) and the BOX layer ($\overline{BOX}$) are determined, the thickness maps are calculated using a linear approximation formula. The ratios $r_{GR}$ and $r_{BR}$ are non-linear functions over a wide dSOI/dBOX range as shown in FIG. 16, which is a graph of modeled ratios $r_{GR}$ and $r_{BR}$ as a function of dSOI and dBOX. However, when viewed over a smaller dSOI/dBOX range such as in FIG. 18, $r_{GR}$ and $r_{BR}$ are much closer to linear functions and can be linearly approximated for a narrow dSOI/dBOX range that is typical for the variations from target of dSOI and dBOX on an SOI structure.

The thickness maps are created by calculating the thickness of all points of the SOI structure as first order deviation maps from the average thickness. That is, the controller 706 determines how much each point of a layer of the SOI structure 31 differs (positive or negative) from the calculated average thickness. This linear approximation may be performed, for example, using $$\left(\frac{SOI}{BOX}\right) = \left(\frac{\Delta SOI}{\Delta BOX}\right) + \left(\frac{\overline{SOI}}{\overline{BOX}}\right) \tag{2}$$

which is equal to $$m^{-1}\left(\frac{\Delta r_{GR}}{\Delta r_{BR}}\right) + \left(\frac{\overline{SOI}}{\overline{BOX}}\right) \tag{3}$$

with $$m = \begin{pmatrix} \dfrac{\partial r_{GR}}{\partial SOI} & \dfrac{\partial r_{GR}}{\partial BOX} \\ \dfrac{\partial r_{BR}}{\partial SOI} & \dfrac{\partial r_{BR}}{\partial BOX} \end{pmatrix} \tag{4}$$

Finally, the determined thicknesses are corrected for error produced by the angle distortion caused by the camera being relatively close to the surface of the SOI structure 31 and not using any collimation optics. That is, e.g., light does not enter the camera all perpendicular to the surface of the SOI structure and parallel to each other. Instead, some of the light near the center enters the camera 702 generally perpendicular to the surface of the SOI structure 31, and some (particularly reflected from the edges of the wafer) enters at significantly different angles and not parallel to the light reflected from the center. The correction may be obtained by $$THK_{corrected}(x, y) = THK(x, y)\sqrt{1 - \frac{n_{Air}}{n_{Layer}} \frac{x^2 + y^2}{z_{lens}^2}} \tag{4}$$

Figure 19:
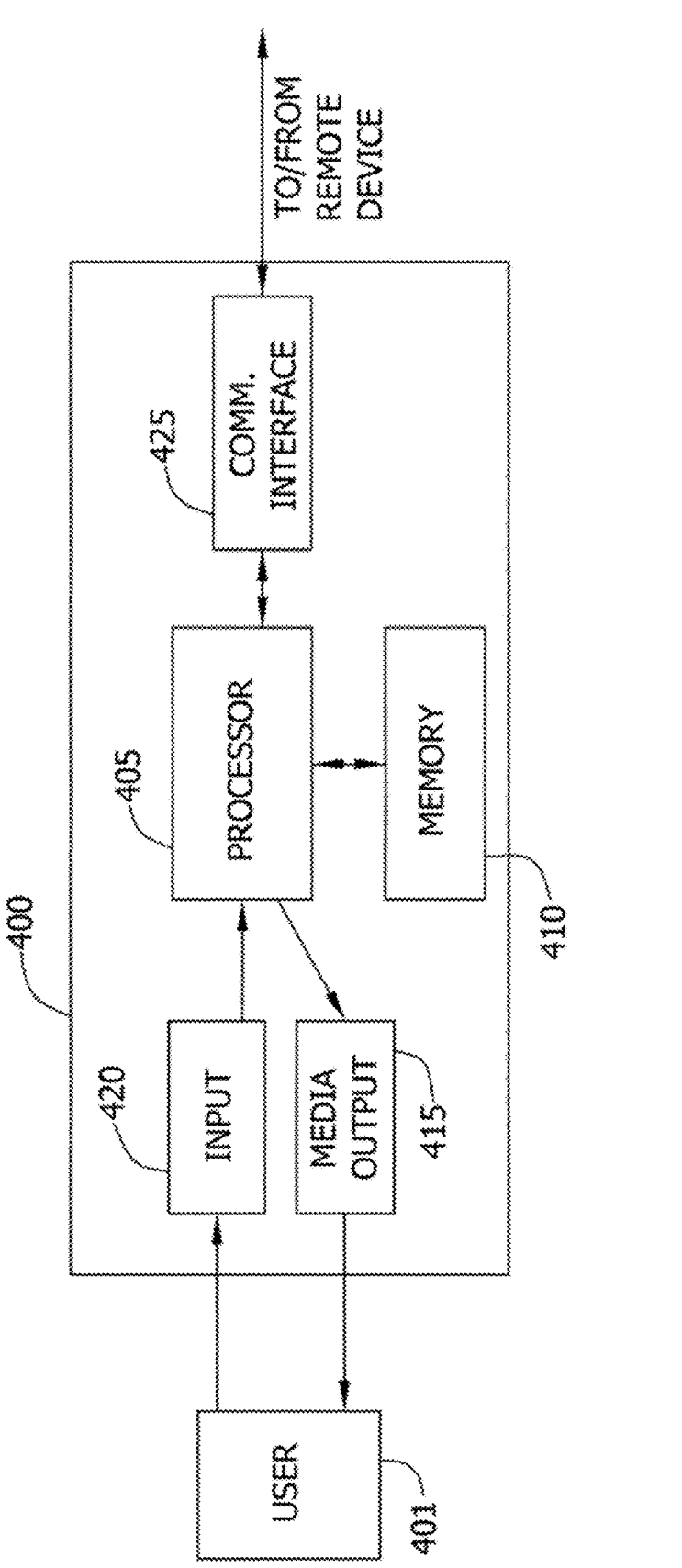
FIG. 19 is a block diagram of an example embodiment of a computing device.

FIG. 19 is a block diagram of an example embodiment of a computing device 400 suitable for use as the controller 130 (FIG. 1) and/or the controller 706 (FIG. 7). For example, computing device 400 is representative of the computing device 106 shown and described above with reference to FIG. 2. Wafer measuring device 102, wafer processing device 104, and removal map profile library 110 may include all or a subset of the components of the computing device 400. The computing device 400 includes a processor 405 for executing instructions. In some embodiments, executable instructions are stored in a memory area 410. The processor 405 may include one or more processing units (e.g., in a multi-core configuration). The memory area 410 is any device allowing information such as executable instructions and/or data to be stored and retrieved. The memory area 410 may include one or more computer readable storage devices or other computer readable media, including transitory and non-transitory computer readable media.

In at least some implementations, the computing device 400 also includes at least one media output component 415 for presenting information to a user 401. The media output component 415 is any component capable of conveying information to the user 401. In some embodiments, the media output component 415 includes an output adapter such as a video adapter and/or an audio adapter. An output adapter is operatively connected to the processor 405 and operatively connectable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, at least one such display device and/or audio device is included in the media output component 415.

In some embodiments, the computing device 400 includes an input device 420 for receiving input from the user 401. The input device 420 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of the media output component 415 and the input device 420.

The computing device 400 may also include a communication interface 425, which may be communicatively connected to one or more remote devices, such as the wafer measuring device 102, the wafer processing device 104, and/or the removal map profile library 110. The communication interface 425 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in the memory area 410 are, for example, processor-executable instructions for providing a user interface to the user 401 via media output component 415 and, optionally, receiving and processing input from the input device 420. The memory area 410 may include, but is not limited to, any computer-operated hardware suitable for storing and/or retrieving processor-executable instructions and/or data. The memory area 410 may include random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). Further, the memory area 410 may include multiple storage units such as hard disks or solid state disks in a redundant array of inexpensive disks (RAID) configuration. The memory area 410 may include a storage area network (SAN) and/or a network attached storage (NAS) system. In some embodiments, the memory area 410 includes memory that is integrated in the computing device 400. For example, the computing device 400 may include one or more hard disk drives as the memory area 410. The memory area 410 may also include memory that is external to the computing device 400 and may be accessed by a plurality of computing devices. The above memory types are exemplary only and are thus not limiting as to the types of memory usable for storage of processor-executable instructions and/or data.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A thickness measuring system comprising:
a camera positioned above a center of a semiconductor structure to capture light reflected by the semiconductor structure;
at least one light source providing incoherent, uncollimated light; and
a controller including a processor and a memory, the controller operatively coupled to the camera and the at least one light source, the memory including instructions that when executed by the processor cause the controller to:
illuminate the semiconductor structure with the incoherent, uncollimated light from the at least one light source;
cause the camera to capture at least one image of the semiconductor structure illuminated by the light from the light source, the at least one image including separate first color, second color, and third color images, the first, second, and third colors being different from each other; and
produce thickness maps for at least two layers of the semiconductor structure based on the first color, second color, and third color images and reference first color, second color, and third color images of a reference silicon wafer, the thickness maps based in part on ratios of light intensity of the first color, second color, and third color images of the semiconductor structure and light intensity of the reference first color, second color, and third color images of the reference silicon wafer, and wherein the instructions cause the controller to produce the thickness maps in part by;
determining a first semiconductor structure ratio of the light intensity of the first color image of the semiconductor structure to the light intensity of the third color image of the semiconductor structure;
determining a second semiconductor structure ratio of the light intensity of the second color image of the semiconductor structure to the light intensity of the third color image of the semiconductor structure;
determining a first reference ratio of the light intensity of the first color image of the reference silicon wafer to the light intensity of the third color image of the reference silicon wafer; and
determining a second reference ratio of the light intensity of the second color image of the reference silicon wafer to the light intensity of the third color image of the reference silicon wafer.

2. The thickness measuring system of claim 1, wherein the instructions cause the controller to produce the thickness maps in part by:
determining a first resulting ratio by dividing the first semiconductor structure ratio by the first reference ratio; and
determining a second resulting ratio by dividing the second semiconductor structure ratio by the second reference ratio.

3. The thickness measuring system of claim 1, wherein the instructions cause the controller to calculate an average thickness of each layer and calculate final thickness maps for each layer as first order deviation maps from the average thickness of that layer.

4. The thickness measuring system of claim 1, wherein the instructions cause the controller to correct the thickness maps for angle distortion caused by the camera being positioned relatively close to the semiconductor structure and collimation optics not being used.

5. The thickness measuring system of claim 1, wherein the semiconductor structure comprises a silicon on insulator (SOI) structure, and the at least two layers comprise an SOI layer and a buried oxide (BOX) layer.

6. The thickness measuring system of claim 1, wherein the first color is red, the second color is green, and the third color is blue.

7. The thickness measuring system of claim 6, wherein the camera comprises a red, green, and blue (RGB) camera.

8. The thickness measuring system of claim 6, wherein the at least one light source comprises a red, green, and blue (RGB) light emitting diode (LED) light.

9. A method of measuring a thickness of a semiconductor structure comprising:
illuminating the semiconductor structure with the incoherent, uncollimated light from at least one light source;
capturing, using a camera, at least one image of the semiconductor structure illuminated by the light from the light source, the at least one image including separate first color, second color, and third color images, the first, second, and third colors being different from each other; and
producing thickness maps for at least two layers of the semiconductor structure based on the first color, second color, and third color images and reference first color, second color, and third color images of a reference silicon wafer, wherein producing the thickness maps includes producing the thickness maps based in part on ratios of light intensity of the first color, second color, and third color images of the semiconductor structure and light intensity of the reference first color, second color, and third color images of the reference silicon wafer, and producing the thickness maps includes:
determining a first semiconductor structure ratio of the light intensity of the first color image of the semiconductor structure to the light intensity of the third color image of the semiconductor structure;
determining a second semiconductor structure ratio of the light intensity of the second color image of the semiconductor structure to the light intensity of the third color image of the semiconductor structure;
determining a first reference ratio of the light intensity of the first color image of the reference silicon wafer to the light intensity of the third color image of the reference silicon wafer; and
determining a second reference ratio of the light intensity of the second color image of the reference silicon wafer to the light intensity of the third color image of the reference silicon wafer.

10. The method of claim 9, wherein producing the thickness maps includes:
determining a first resulting ratio by dividing the first semiconductor structure ratio by the first reference ratio;
determining a second resulting ratio by dividing the second semiconductor structure ratio by the second reference ratio; and producing the thickness maps based on the first resulting ratio and the second resulting ratio.

11. The method of claim 9, wherein producing the thickness maps includes calculating an average thickness of each layer and calculating final thickness maps for each layer as first order deviation maps from the average thickness of that layer.

12. The method of claim 11, wherein calculating final thickness maps for each layer as first order deviation maps from the average thickness of that layer is performed using $$\left(\begin{array}{c} SOI \\ BOX \end{array}\right) = \left(\begin{array}{c} \Delta SOI \\ \Delta BOX \end{array}\right) + \left(\begin{array}{c} \overline{SOI} \\ \overline{BOX} \end{array}\right).$$

13. The method of claim 11, wherein $$\left(\begin{array}{c} SOI \\ BOX \end{array}\right) = \left(\begin{array}{c} \Delta SOI \\ \Delta BOX \end{array}\right) + \left(\begin{array}{c} \overline{SOI} \\ \overline{BOX} \end{array}\right) = m^{-1}\left(\begin{array}{c} \Delta r_{GR} \\ \Delta r_{BR} \end{array}\right) + \left(\begin{array}{c} \overline{SOI} \\ \overline{BOX} \end{array}\right)$$

with

-continued $$m = \left(\begin{array}{cc} \dfrac{\partial r_{GR}}{\partial SOI} & \dfrac{\partial r_{GR}}{\partial BOX} \\ \dfrac{\partial r_{BR}}{\partial SOI} & \dfrac{\partial r_{BR}}{\partial BOX} \end{array}\right).$$

14. The method of claim 9, further comprising correcting the thickness maps for angle distortion caused by the camera being positioned relatively close to the semiconductor structure and collimation optics not being used.

15. The method of claim 14, wherein correcting the thickness maps is performed using $$THK_{corrected}(x, y) = THK(x, y)\sqrt{1 - \frac{n_{Air}}{n_{Layer}} \frac{x^2 + y^2}{z_{lens}^2}}.$$

16. The method of claim 9, wherein the semiconductor structure comprises a silicon on insulator (SOI) structure, and the at least two layers comprise an SOI layer and a buried oxide (BOX) layer.

\*  \*  \*  \*  \*